United States Patent [19]

Heskett et al.

[11] 3,817,381

[45] June 18, 1974

[54] FLUID TREATING APPARATUS AND METHOD

[75] Inventors: Don E. Heskett, Villa Park; John Barthello Heskett, Lombard, both of Ill.

[73] Assignee: Morton-Norwich Products, Inc., Chicago, Ill.

[22] Filed: July 12, 1971

[21] Appl. No.: 161,533

Related U.S. Application Data

[60] Continuation of Ser. No. 86,043, Nov. 2, 1970, abandoned, which is a division of Ser. No. 581,507, Dec. 23, 1966, Pat. No. 3,538,020, which is a continuation-in-part of Ser. No. 490,802, Sept. 28, 1965, abandoned.

[52] U.S. Cl.................. 210/140, 210/284, 210/496
[51] Int. Cl...................... B01d 27/12, B01d 27/02
[58] Field of Search........ 210/27, 32, 140, 266, 269, 210/284, 314, 496

[56] References Cited
UNITED STATES PATENTS

| | | | |
|---|---|---|---|
| 2,203,040 | 6/1940 | Bassett, Jr............. | 210/140 |
| 3,005,514 | 10/1961 | Cole et al. ........ | 210/496 X |
| 3,126,335 | 3/1964 | Stipe................. | 210/140 X |
| 3,360,131 | 12/1967 | Witkowski............ | 210/496 X |
| 3,381,823 | 5/1968 | Nash................. | 210/496 X |

*Primary Examiner*—Frank A. Spear, Jr.
*Attorney, Agent, or Firm*—Lockwood, Dewey, Zickert & Alex

[57] ABSTRACT

A fluid treating apparatus is described which includes a fluid treating cartridge having a body of closely spaced fluid treating aggregate particles bound together by a matrix which consists essentially of a cured resinous polymeric material which aggregate particles have their surface area freely exposed for contacting fluids to be treated therewith and wherein means is provided for passing fluid to be treated through said cartridge during normal service operations and for alternatively supplying a regenerating fluid to said cartridge for regeneration of the treating capacity thereof.

In a preferred embodiment, a water softener is disclosed wherein water to be treated is initially passed through series connected carbon filter and ion exchange resin cartridges, both of which are of the type described and claimed in U.S. Pat. No. 3,538,020. A rotatable valve is provided which in a service mode directs water to be treated through the carbon and ion exchange resin cartridges and then to a water discharge outlet connection. This valve, in a regeneration mode, communicates a brine storage compartment with the cartridge. Control means is provided for alternatively positioning the valve in the service or regeneration modes and a brine control means regulates the quantity of brine passed through the ion exchange cartridge during a given regeneration operation.

13 Claims, 4 Drawing Figures

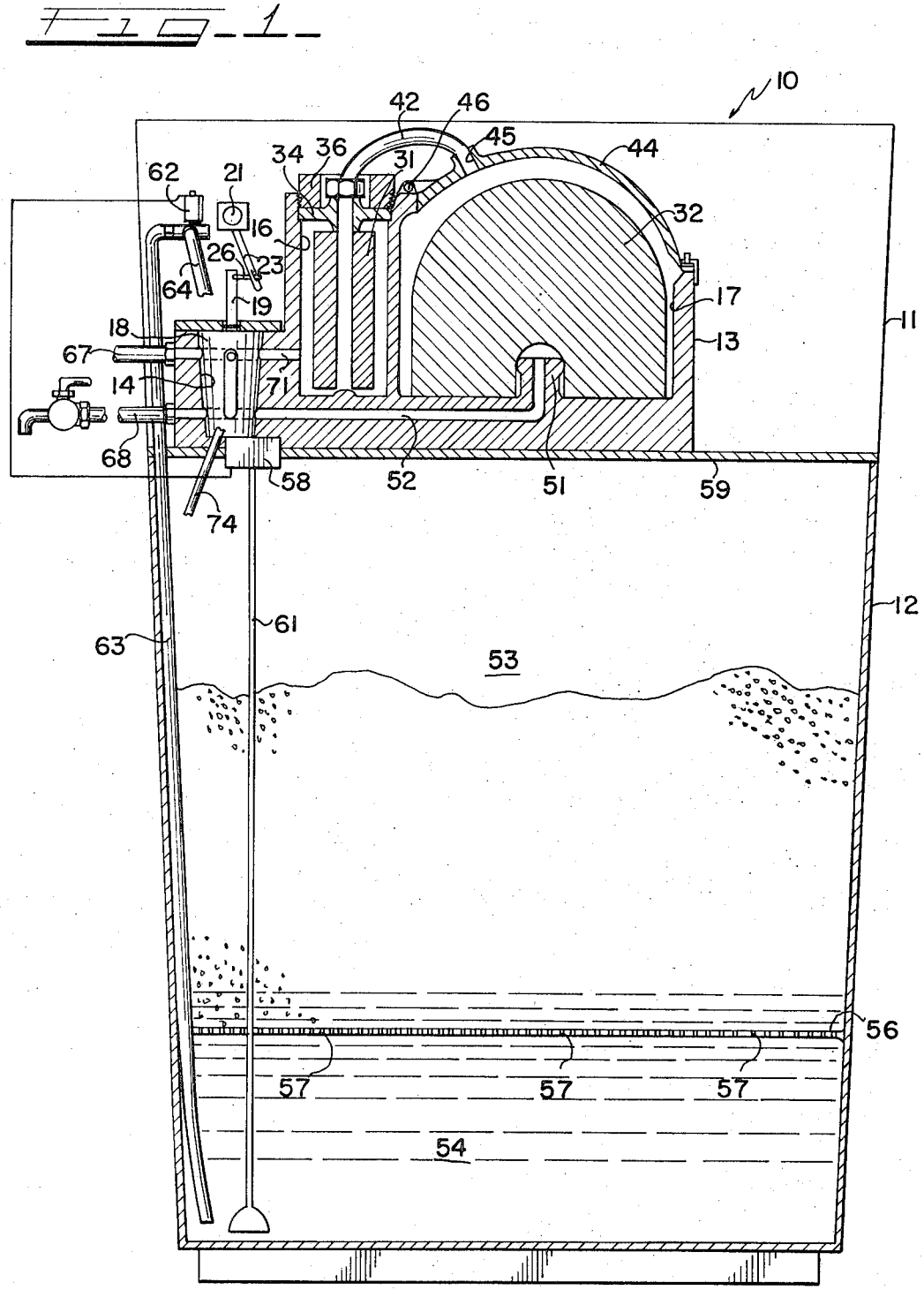

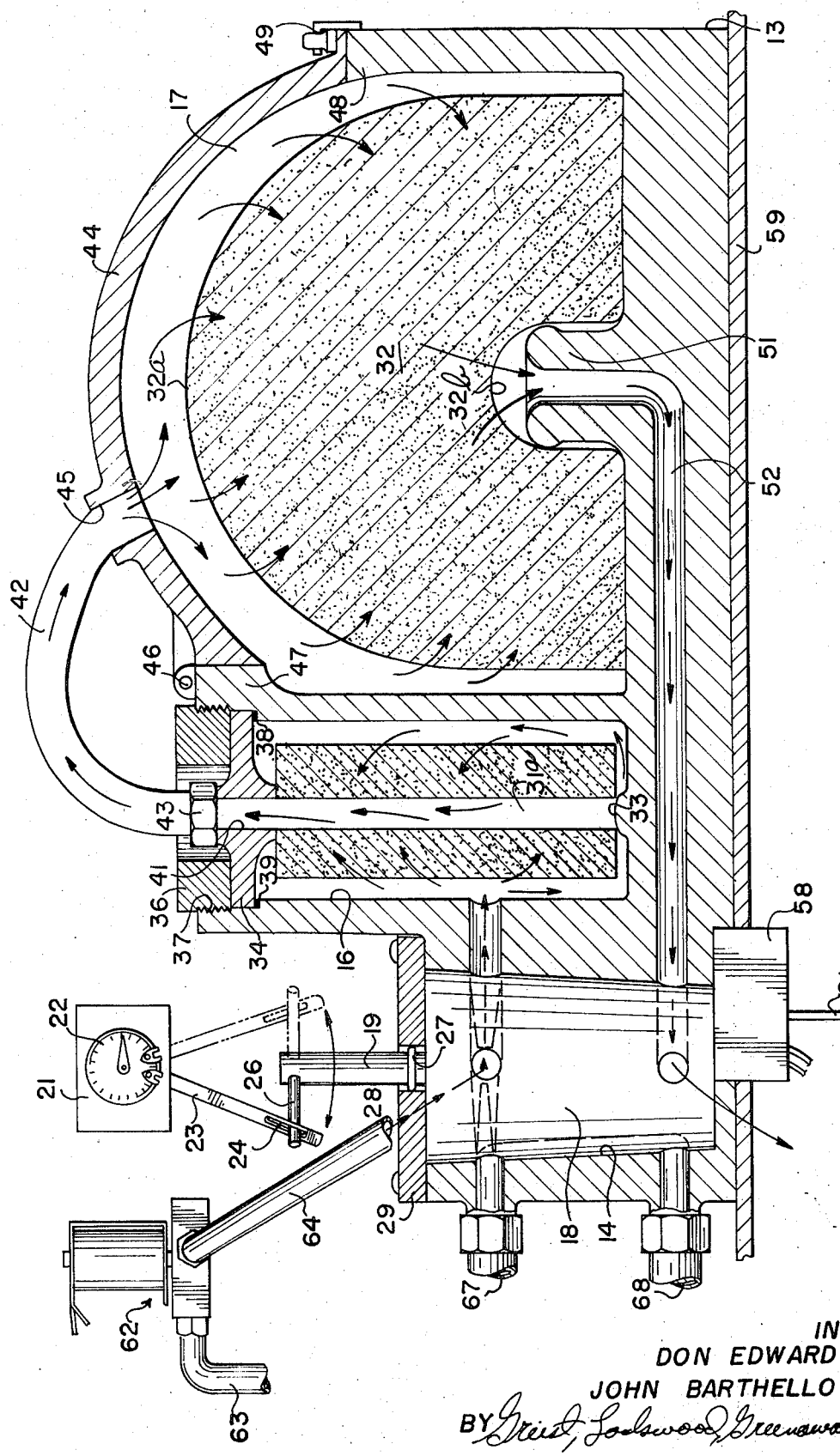

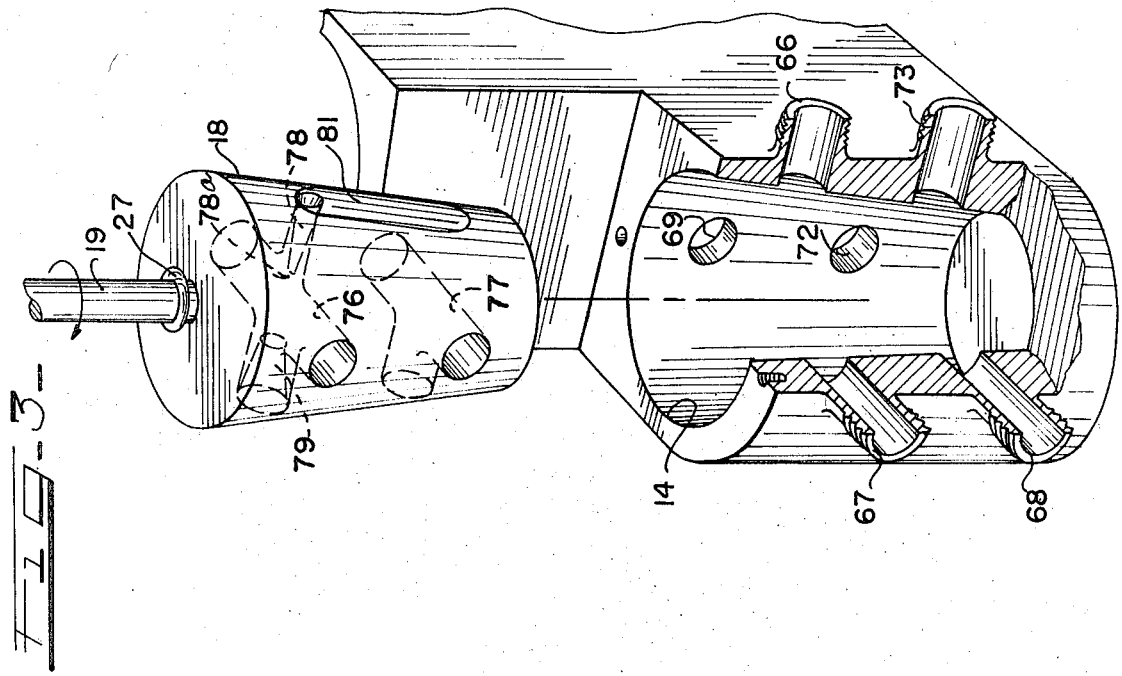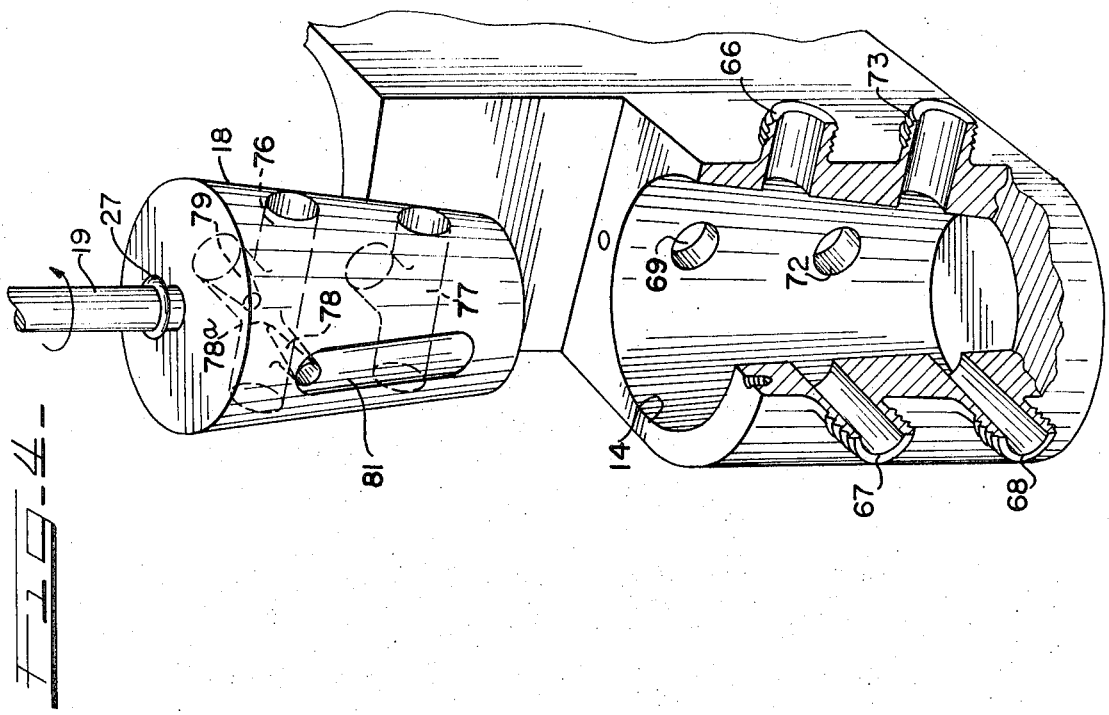

FLUID TREATING APPARATUS AND METHOD

This application is a continuation-in-part of our pending U.S. application Ser. No. 86,043, filed Nov. 2, 1970 and entitled "Method of Making Fluid Purification Device," (now abandoned in favor of pending continuation application Ser. No. 346,965, filed Apr. 2, 1973 and also entitled "Method of Making Fluid Purification Device") which is a divisional application of application Ser. No. 581,507, filed Dec. 23, 1966, entitled "Fluid Purification Device Containing a Cartridge of Polymer Entrapped Aggregate Particles," now U.S. Letters Pat. No. 3,538,020, which is a continuation-in-part of original application Ser. No. 490,802, filed Sept. 28, 1965 and entitled "Fluid Purification Device and Method of Producing Same," now abandoned.

The present invention generally relates to an improved fluid treating apparatus and, more particularly, to water treating apparatus such as water softeners, demineralizers, apparatus for removing undesirable flavor and color from water or other fluids and the like which incorporate a novel surface active aggregate particle cartridge and wherein alternative service and regeneration modes are provided.

In our U.S. Pat. No. 3,538,020, we have described a generally porous fluid treating cartridge characterized by a plurality of surface active fluid treating aggregate particles which are bound together in closely packed abutting relationship to each other in a matrix formed of a resinous polymeric material. The present invention utilizes that cartridge in a novel fluid treating device. The materials which can be used to form the matrix or aggregate binding medium of that cartridge can generally be described as those liquid polymeric materials which can be reacted or otherwise changed to provide a solid structure by the application of heat, water, other chemicals or any combination thereof. In this regard, as is disclosed in the above mentioned patent, it has been found that the urethane prepolymers are particularly suitable since when used in amounts called for therein, they provide a polyurethane binding medium which covers only a very minor percent of the surfaces of the aggregate particles, leaving them substantially free for contact with fluids to be treated. These urethane prepolymers are well known, however, a general description thereof is found in U.S. Letters Pat. Nos. 3,024,207 and 3,094,494. Any of the well known techniques for synthesis of the polyurethanes can be used, such as the "prepolymer method" as well as the "quasi prepolymer method" and "one shot system." Examples of commercially available urethane prepolymer resins which can be used in forming the particle entrapping or aggregate binding porous matrix of the present invention include a Simoniz Company prepolymer and Nopco Chemical Co. prepolymer SX-159D, both of which are fully described in U.S. Pat. No. 3,538,020.

It is important to note that while the "prepolymer" and other methods of synthesis referred to above are primarily directed to the forming of foam bodies, that the matrices or entrapping media of cartridges employed in the present invention do not resemble the typical polyurethane foam cell structures, namely, cell structures which are more or less characterized by dodecahrdra and pentagonal sides and thin cells occupying the planes of each pentagon.

Examples of other polymeric systems which may be used in forming the particle entrapping matrices of these cartridges include the epoxy foamable two-component liquid systems, the phenolic foamable resins, as well as the polyvinyl formal polymeric systems.

The aggregate particles which are used in these fluid treating cartridges include all aggregate particles which are conventionally used in fluid treating operations. For example, ion exchange resin beads, activated carbon, manganese greensand, and the like can be used either alone or in combination as the aggregate constituent of these cartridges. It is important to note that these cartridges have aggregate particles which are not limited to specific particle sizes. In most instances, it is preferred to use aggregate particles having relatively small particle sizes in order to provide greater surface area for contacting fluids to be treated. Fluid treating cartridges having aggregate particle sizes ranging from 20 mesh to as small as 300 mesh or finer can advantageously be incorporated into the water treating devices of the present invention to provide extremely fast and efficient fluid treatment and regeneration.

Referring to one important use of the present invention, namely, water softening, it is known that water softeners for domestic use are normally used under conditions of intermitent rather than continous water flow, that is, water is drawn through the treating system for a given time, such as the time required for filling a washing machine, dishwasher or the like, or is periodically withdrawn for cooling or drinking purposes or the like. Accordingly, it is normal to operate water faucets communicating with these prior art water softeners for intermitten periods of varying lengths.

In one common form of such commercially available water treating devices, namely, water softeners, which typically function to remove the "hardness" from water by removing therefrom objectionable ions such as calcium, barium, magnesium and the like by chemical methods, it is common to provide a loose bed of ion exchange material which will take on a number of calcium ions and release an equivalent number of sodium ions into the water downstream of the ion exchanger. After a certain amount of cumulative hardness is removed from the water, the capacity of the ion exchange material is depleted and it is thereafter replenished by washing the ion exchange material with brine and rinsing with water, whereupon the treating cycle is again repeated. During the time regeneration takes place, water service is either shut off or the water flow by-passes the ion exchanger so that hard water is used during this period. In these loose bed water softeners, while the particle size of the aggregate may vary considerably, it is generally known that finer particle size ion exchange resin bead particles, while advantageously exhibiting an increasingly faster ion exchange rate and regeneration speed, cannot be employed since these finer particle size beads become easily imbedded in the screens which are used to contain them. Also, since in these loose bed water softening devices of conventional construction, the ion exchange resin beads are not in fixed relation to each other, they exhibit a tendency to settle and thereby provide irregular flow paths therethrough which are characterized by non-uniform pressure drops.

In view of the foregoing and other shortcomings of prior art water softening devices and the failure thereof to provide practical, simple and effective fluid treating apparatus having the advantages and characteristics referred to herein and other inherent characteristics and advantages, it is an object of the present invention to provide a fluid treating apparatus which utilizes as an important component thereof, an ion exchange resin bead cartridge of the type wherein ion exchange resin bead particles are bound together in a closely spaced relationship to each other by a matrix which consists essentially of a cured resinous polymeric material, these aggregate particles have substantially their entire surface area freely exposed for contacting fluid to be treated therewith and are further distributed throughout the body of the fluid treating device in generally fixed relationship to each other in substantially the same manner as they would be distributed in a loose bed.

Another object of the present invention is to provide a fluid treating device and method wherein screens for containing loose beds of fluid treating aggregate particles are not required.

Another object of the present invention is to provide an improved fluid treating device and method wherein a plurality of surface active aggregate particles are bound together in a cartridge by a matrix which consists essentially of a cured resinous polymeric material formed from liquid reactants and selected from the class consisting of polyurethane resin systems, epoxy foamable two-component resin systems, polyvinyl formal polymeric systems and the phenolic foamable resin systems, which cartridges exhibit all inherent characteristics, properties and advantages thereof.

Another object of the present invention is to provide an improved fluid treating apparatus and method which incorporates fluid treating aggregate particles such as, for example, activated carbon and ion exchange resin beads which are bound together by a matrix which consists essentially of the cured resinous polymeric material formed from liquid reactants selected from the class consisting of polyurethane resin systems, epoxy foamable two-component resin systems, polyvinyl formal polymeric systems and the phenolic foamable resin systems.

Another object of the present invention is to provide an apparatus and method in which surface active aggregate treating particles are contained in a rigid, semi-rigid, or self-sustaining cartridge in generally fixed relationship to each other.

Another object of the present invention is to provide an apparatus and method in which fluid flow through the treating apparatus is maintained at all times rather than being diminished as the capacity of the exchange material is depleted.

Another object of the present invention is to provide an improved fluid treating apparatus and method in which a cartridge comprised of very fine mesh ion exchange material or the like is used to provide a rapid rate of exchange.

Another object of the present invention is to provide a fluid treating apparatus and method wherein a by-passing circuit is provided during regeneration.

Another object of the present invention is to provide an improved fluid treating apparatus and method wherein means is provided for directing flow of fluid to be treated through two or more treating cartridges arranged in series with each other.

Another object of the present invention is to provide an improved fluid treating apparatus and method which includes means for accommodating two or more fluid treating cartridges, each adapted for removal of different constituents or groups of constituents from the fluid to be treated.

Another object of the present invention is to provide an improved fluid treating apparatus and method wherein fluid to be treated is initially filtered in an activated carbon cartridge and thereafter treated in an ion exchange resin cartridge, both of which generally embody the novel features described in U.S. Pat. No. 3,538,020.

Another object of the present invention is to provide a fluid treating apparatus and method wherein replacement of the treating element is greatly simplified.

These and other objects and advantages which are inherent in the invention are accomplished by providing a fluid treating cartridge formed of closely spaced fluid treating aggregate particles bound together by a matrix which consists essentially of a cured resinous polymeric material. These aggregate particles have substantially their entire surface area freely exposed for contacting fluid to be treated therewith and are distributed throughout the body of the fluid treated cartridge in substantially abutting relationship to each other in the same general manner as it would be distributed in a loose bed. Preferably, the matrix consists essentially of a cured resinous polymeric material formed from liquid reactants selected from the class consisting of polyurethane resin systems, epoxy foamable two-component resin systems, polyvinyl formal polymeric systems, and the phenolic foamable resins. Means are provided for passing a fluid to be treated through the fluid treating cartridge during normal service flow. Alternatively, when regeneration is required, means are provided for by-passing flow from the water inlet directly to the water discharge outlet, while, at the same time, supplying fluid to the cartridge for regeneration of the treating capacity thereof.

The exact manner in which the invention accomplishes these objects will be more clearly apparent when reference is made from the following detailed description of a preferred embodiment of this invention, taken in conjunction with the accompanying drawings wherein:

FIG. 1 is a vertical sectional view of a fluid treating apparatus made in accordance with the present invention wherein the apparatus is in service-mode operation;

FIG. 2 is an enlarged vertical section of the valve body and treating cartridge portion of the fluid treating apparatus shown in FIG. 1 with the apparatus in regeneration mode operation;

FIG. 3 is a fragmentary exploded perspective view of the valve component of the fluid treating apparatus shown in FIGS. 1 and 2 with the valve body thereof removed from the valve housing and in service mode position; and FIG. 4 is a view similar to FIG. 3 with the valve shown in regeneration mode position.

Referring to the drawings and with particular reference to FIGS. 1 and 2, a water treating device embodying principles of the present invention is generally designated by the reference numeral 10. As best shown in FIG. 1, the water treating apparatus 10 includes an upper container housing 11 which encloses the main operating component of the apparatus and a lower container housing 12 which encloses the salt and brine storage sections thereof.

In the illustrated embodiment, enclosed within upper container housing 11 is a frame 13 which includes a valve well 14, activated carbon cartridge compartment 16 and ion exchange resin compartment 17. A rotatable valve 18 is provided with a fixed vertically extending shaft 19 which in turn is connected to a fixed-interval mechanism such as a timer unit 21 of conventional construction. As is best shown in FIG. 2, timer 21 includes a calibrated dial 22 and an arm 23 which quickly moves in a pendulum-like motion across an arcuate path at the end of a predetermined time interval in accordance with a preselected setting on dial 22. Arm 23 is provided with a loss motion slot 24 which receives a radially extending control arm 26 that, in turn, is fixed to the shaft 19. As will be readily apparent, movement of the timer arm 23 operates to rotate valve element 18 for positioning the valve in each of its service and regeneration modes as will be more fully described later. An O-ring 27 forms a seal between shaft 19 and an aperture 28 formed in a valve cover plate 29.

Enclosed within the compartments 16 and 17 are a carbon cartridge 31 and ion exchange resin cartridge 32 which are constructed in accordance with the teachings of U.S. Pat. No. 3,538,020, the disclosure of which is incorporated herein by reference. In particular, carbon cartridge 31 is composed of finely divided activatd carbon particles which are bound together by a matrix which consists essentially of a cured resinous polymeric material. Preferably, the liquid reactants which are used to form the cured resinous polymeric matrix of the activated carbon cartridge are selected from the class consisting of polyurethane resin systesm, epoxy foamable two-component resin systems, polyvinyl formal polymeric systems and the phenolic foamable resin systems. Similarly, the cartridge 32 is formed of ion exchange resin beads which are preferably of fine mesh size which are entrapped in a similar cured resinous polymeric matrix. In accordance with the teachings of U.S. Pat. No. 3,538,020, the matrix which contains these surface active aggregate particles is formed from a reacted polymer mass characterized by relatively little foam or bubble formation and has a volume which is substantially less than the interstitial volume between the closely packed aggregate particles. Further, these aggregate particles have substantially their entire surface area freely exposed for contacting the fluids to be treated therewith and are distributed throughout the body of the fluid treating cartridge in substantially abutting relationship to each other in substantially the same manner as they would be distributed in a loose bed. While in the illustrated embodiment the specific aggregates employed in each of the cartridges are activated carbon and ion exchange resin beads, respectively, it will be appreciated by those skilled in this art that other finely divided fluid treating aggregate particles might be substituted in place thereof without departing from the scope of the present invention.

Activated carbon cartridge 31 seats upon a nodule 33 formed in the bottom wall of compartment 16 and is securely held therein by a retainer plate 34 and retainer plug 36 which is engaged in a socket 37 which is coaxially aligned with the compartment 16. An O-ring 38 sealingly engages the inside surface of retainer plate 34 and a shoulder portion 39 adjacent the upper end of compartment 16. As is shown, retainer plate 34 is provided with a central opening 41 which is connected to one end of a flexible tubing section 42 by means of a hex nut 43. The other end of tubing section 42 is received within an opening 43 formed in cover plate 44 which is pivotally mounted by a hinge member 46 to a vertically extending sidewall portion 47 of frame 13. Cover 44 is releasably fastened to outer upwardly extending sidewall 48 of frame 13 by means of a latch assembly 49. In this manner, replacement of the ion exchange resin cartridge is easily facilitated while, at the same time, when securely fastened, a fluid tight seal is achieved within the compartment 17. As is best shown in FIGS. 1 and 2, cartridge 32 is seated on a collar 51 having a conduit 52 which communicates compartment 17 with valve well 14.

Lower container housing section 12 includes a salt storage compartment 53 and brine storage compartment 54. Salt contained within storage compartment 53 rests on a grid table or plate 56 which is provided with a plurality of holes or openings 57. The water, or other fluid, level is maintained in the apparatus 10 so that it engages the salt at the lower end of chamber 53 and thereby solubilizes the same to provide a suitable regenerating fluid.

A diaphragm switch 58 is mounted to container housing plate 59. Diaphragm switch 58 is more specifically described in U.S. Pat. No. 3,470,905, the disclosure of which is incorporated herein by reference. In particular, diaphragm switch 58 is of the pressure responsive type and includes a conduit 61 which extends to the lower portion of compartment 54. An electrical lead line communicates diaphragm switch 58 with a solenoid valve assembly 62, the construction and operation of which is also described in said U.S. Pat. No. 3,470,905. Solenoid assembly 62 includes a brine suction line 63 which communicates with the lower portion of the brine storage compartment 54. A brine feed line 64 communicates the solenoid valve assembly 62 with a brine inlet connection 66 which directs brine directly into valve well 14.

Referring to each of FIGS. 3 and 4, the valve assembly is illustrated in a fragmentary perspective view with the valve 18 removed from the valve well 14 in order to more clearly illustrate the same. In particular, in FIG. 3, valve element 18 is shown in the rotational orientation which it occupies during normal service mode operation while, in FIG. 4, the valve 18 is shown in the rotational position which it occupies during the regeneration mode operation. In each of FIGS. 3 and 4, the valve well is shown to include a water inlet connection 67 and water discharge connection 68. Water inlet connection 67 is in axial alignment with an upper valve housing port 69 which discharges into conduit 71 for communication with the activated carbon cartridge compartment 16. Similarly, water discharge connection 68 is in direct communication with a lower valve housing port 72 which connects directly to conduit 52. In direct vertical alignment with brine inlet connection 66 is a connection 73 which communicates to a drain line 74 for discharge of materials from the valve well 14 directly to waste.

While the respective valve housing fittings thus described are, in the illustrated embodiment, shown in particular geometric relation to each other, it will be appreciated that deviations therefrom can be made without departing from the scope of the present invention.

In the service mode, illustrated in FIGS. 1 and 3, upper valve passageway 76 interconnects water inlet connection 67 with upper valve housing port 69. Correspondingly, water discharge connection 68 communicates directly with lower valve housing port 72 through a lower valve passageway 77. Accordingly, in service mode operation, upper valve passageway 76 is in direct registration with water inlet connection 67 and upper valve housing port 69 while lower valve passageway 77 is in direct registration with water discharge connection 68 and lower valve housing port 72. In this manner, water received from the inlet connection will pass directly from inlet connection 67 through valve passageway 76 and conduit 71 into the activated carbon cartridge compartment 16. That water then is discharged radially inwardly through activated carbon cartridge 31 into the hollow core 31a thereof and upwardly through the inner core into ion exchange resin bead cartridge compartment 17 via flexible tubing line 42. Accordingly, in this embodiment, the water is filtered prior to its contacting the ion exchange cartridge 32 so that particulate contaminants thereof which adversely affect the ion exchange beads in cartridge 32 are eliminated. Also, the activated carbon filter 31 operates to remove undesirable taste and odor contaminants in the water. After passing through carbon filter 31, water is received within compartment 17 and passes along the inlet surface 32a of ion exchange resin cartridge into the cartridge wherein ion exchange treatment thereof in accordance with known principles is accomplished. The water after being so treated is then discharged through the cartridge discharge surface 32b into the conduit 52. In this regard, it should be noted that while, in the illustrated embodiment, ion exchange resin cartridge 32 is shown in a generally hemispherical configuration, other configurations, such as, for example, the sleeve like tubular configuration of the activated carbon cartridge 31 could be suitably employed in place thereof. The thus treated water is discharged from conduit 52 into valve passageway 77 and therefrom directly out of water discharge connection 68 for use in the desired manner.

After a predetermined interval, timer device 68 rotates valve 18 in a clockwise direction to a sufficient extent that water inlet connection 67 now directly communicates with a venturi type injector 78. In this position, valve passageway 76 is now in direct communication with brine inlet connection 66. A small diameter opening 78a in venturi injector 78 operates to convert the pressure head of the water to a velocity head thereby producing a reduced pressure on the discharge side of the venturi in valve passageway 76. Preferably, venturi opening 78a is in coaxial alignment with valve throat element 79. The relative size of the opening 78a and 79 will, in accordance with known principles, be sufficient so that with normal line pressure at water inlet connection 67 a sufficient amount of suction will be developed in valve passageway 76 so as to draw brine from brine storage compartment 54 through brine suction line 63, solenoid valve assembly 62 and brine feed line 64 into brine inlet connection 66. This brine will then be directly discharged through upper valve port 69 into conduit 71, through activated carbon cartridge 31 and into ion exchange resin bead cartridge 32 wherein the desired regeneration thereof is effected. During regeneration, if water is required by the user, such water will be directly transmitted from water inlet connection 67 to water discharge connection 68 via a valve by-pass element 81. After passing through ion exchange cartridge 32, the spent regenerating fluid is discharged to waste through conduit 52, lower valve housing port 72, valve passageway 77, outlet connection 73 and drain line 74.

The amount of brine which is used in a given regeneration cycle is regulated by pressure switch 58 which, as previously noted, is constructed and operates in accordance with the disclosure of U.S. Pat. No. 3,470,905. In this regard, however, it should be noted that if desired, pressure switch 58 could be replaced by volume regulating devices well known to those skilled in the art such as, for example, a float valve arrangement.

After a predetermined quantity of brine solution has been discharged to ion exchange resin cartridge 32 to effect complete regeneration thereof, pressure switch 58 actuates the solenoid in the brine solenoid valve assembly 62 causing the brine valve to close. Rinsing of the cartridges 31 and 32 is achieved by having fresh water from inlet conduit 67 continue to flow through the activated brine and carbon cartridges for a predetermined period of time controlled by timer 21. After the desired degree of rinsing has been achieved, timer element 21 rotates valve 18 in a counter clockwise direction so that the valve passageways 76 and 77 thereof are in registration with inlet connection 67 and discharge outlet 68, respectively.

It should be noted that while actuation of the valve element 18 in the illustrated embodiment has been achieved through a timer element 21, other regeneration triggering devices may be substituted in place thereof. These include, of course, commercially available electromechanical and like hardness detectors which indicate when regeneration is needed, as well as other means which are equivalent thereto.

The present invention has been described with reference to treatment of water as a fluid. It is well known, however, that cartridges of the type referred to herein and others having similar characteristics and uses, may be advantageously used for a number of other purposes, including the following:

removal of cyanide from plating baths; deionization of liquids, including removal of both cations and anions therefrom; deashing and color removal in cane sugar processing; removal of organic impurities from various aqueous systems; molasses purification and purification of other vegetal products; removal of iron from phosphoric acid in pickling baths; removal of zinc from treating baths; removal of chromic acid from the rinse water of plating baths; removal or iron from hydrochloric acid; impurity removal during production of methanol, acetone and other ketones such as methyl ethyl ketone and the like; deashing and turbidity removal from non-aqueous systems, such as spin bath solvent systems and liquors; platinum and other precious metal removal from concentrated hydrochloric acid; removal or separation of polyols in the manufacture of glycerine; analytical uses such as protein separation and the like, including elutriation and concentration of proteins; and other processes known to those skilled in the art to be carried out or aided by the use of ion exchange systems.

It will be apparent to those skilled in this art that the present invention can be embodied in various forms of fluid treating devices, all of which feature a number of advantages and characteristics, including those pointed out and others which are inherent in the invention. Accordingly, the present invention is to be construed and limited only by the scope of the appended claims.

We claim:

1. A water treating device comprising a water treating cartridge which includes a body of closely packed ion exchange resin bead particles bound together by a matrix which consists essentially of a cured resinous polymeric material formed from liquid reactants selected from the class consisting of polyurethane resin systems, epoxy foamable two-component resin systems, and polyvinyl formal polymeric systems, said matrix having been formed from a reacted polymer mass characterized by relatively little bubble formation and having a volume less than the interstitial volume between said closely packed ion exchange resin bead particles, said fluid treating aggregate particles having substantially their entire surface area freely exposed for contacting fluid to be treated therewith and further being distributed throughout the body of said water treating cartridge in substantial abutting relationship to each other in substantially the same manner as said aggregate particles would be distributed in a loose bed, means for passing water to be treated through said cartridge during normal service, and means for alternatively supplying a regenerating fluid to said cartridge for regeneration of the treating capacity thereof.

2. The water treating device of claim 1 wherein said matrix consists essentially of a cured polyurethane.

3. The water treating device of claim 1 wherein said means for supplying regenerating fluid to said cartridge includes a regenerating fluid tank and means associated therewith for supplying a predetermined quantity of regenerating fluid to said cartridge.

4. The fluid water treating device of claim 1 which further includes means for by-passing said water around said cartridge during at least a portion of the time during which said regenerating fluid is being supplied to said cartridge.

5. The water treating device of claim 1 wherein the aggregate particles comprise at least 75 percent of the total volume of said fluid treating cartridge.

6. The water treating device of claim 1 in which said regenerating fluid comprises a brine solution.

7. An apparatus for treating water, said apparatus comprising: an inlet water connection, a water treating cartridge which includes a body of closely packed ion exchange resin bead particles bound together by a matrix which consists essentially of a cured resinous polymeric material formed from liquid reactants selected from the class consisting of polyurethane resin systems, epoxy foamable two-component resin systems, and polyvinyl formal polymeric systems, said matrix having been formed from a reacted polymer mass characterized by relatively little bubble formation and having a volume less than the interstitial volume between said closely packed ion exchange resin bead particles, said ion exchange resin bead particles having substantially their entire surface area freely exposed for contacting water to be treated therewith and being distributed throughout the body of said water treating cartridge in substantial abutting relationship to each other in substantially the same manner as said particles would be distributed in a loose bed, said cartridge having inlet and outlet surfaces through which water being treated is respectively received and discharged; a discharge water connection; first conduit means communicating said inlet water connection with the inlet surface of said cartridge and second conduit means communicating the outlet surface of said cartridge with said discharge water connection; a storage compartment adapted to contain a quantity of brine solution; valve means which in a service mode is adapted to direct water to be treated which is received from said inlet water connection through said water treating cartridge and, after the desired treatment thereof has been effected, to said discharge water connection, said valve means in an alternative regeneration mode being adapted to communicate said brine storage compartment with said water treating cartridge; valve control means for alternatively positioning said valve means in either of said service or regeneration modes; and, brine control means for regulating the quantity of brine which is passed through said water treating cartridge during a given regeneration mode positioning of said valve means.

8. The water treating device of claim 7 wherein said valve means is adapted to provide direct communication between said inlet water connection and said discharge water connection during at least a portion of the time when said valve means is in a regeneration mode.

9. An apparatus for treating water, said apparatus comprising: a first water treating cartridge which includes a body of closely packed carbon particles bound together by a matrix which consists essentially of a cured resinous polymeric material formed from liquid reactants selected from the class consisting of polyurethane resin systems, epoxy foamable two-component resin system, and polyvinyl formal polymeric systems, said matrix having been formed from a reacted polymer mass characterized by relatively little bubble formation and having a volume less than the interstitial volume between said closely packed carbon particles, said carbon particles having substantially their entire surface area freely exposed for contacting water to be treated therewith and being distributed throughout the body of said cartridge in substantial abutting relationship to each other in substantially the same manner as said particles would be distributed in a loose bed, said first cartridge having inlet and outlet surfaces through which water being treated is respectively received and discharged; an inlet water connection; first conduit means communicating said inlet water connection with the inlet surface of said first cartridge; a second water treating cartridge which includes a body of closely packed ion exchange resin beads bound together by a matrix which consists essentially of a cured resinous polymeric material formed from liquid reactants selected from the class consisting of polyurethane resin systems, epoxy foamable two-component resin systems, and polyvinyl formal polymeric systems, said matrix having been formed from a reacted polymer mass characterized by relatively little bubble formation and having a volume less than the interstitial volume between said closely packed ion exchange resin bead particles, said ion exchange resin bead particles having substantially their entire surface area freely exposed for contacting water to be treated therewith and being distributed throughout the body of said cartridge in substantial abutting relationship to each other in substantially the same manner as said particles would be distributed in a loose bed, said second cartridge having inlet and outlet surfaces through which water being treated is respectively received and discharged; second conduit means communicating the outlet surface of said first cartridge with the inlet surface of said second cartridge; a discharge water connection; third conduit means communicating the outlet of said second cartridge with said discharge water connection; a storage compartment adapted to contain a quantity of brine solution; valve means which in a service mode is adapted to direct water to be treated which is received from said inlet water connection through said first and second cartridges and out said discharge water connection after the desired treatment thereof has been effected, said valve means in an alternative regeneration mode being adapted to communicate said brine storage compartment with said second cartridge; valve control means for alternatively positioning said valve means in either of said service or regeneration modes; and brine control means for regulating the quantity of brine which is passed through said second cartridge during a given regeneration mode position of said valve means.

10. The water treating device of claim 7 wherein the matrix of said water treating cartridge consists essentially of a cured polyurethane.

11. The water treating device of claim 9 wherein the matrix in each of said first and second cartridges consists essentially of a cured polyurethane.

12. The water treating device of claim 9 wherein said valve means is adapted to provide direct communication between said inlet water connection and said discharge water connection during at least a portion of the time that said valve means is in a regeneration mode position.

13. The water treating device of claim 9 wherein said valve control means is a timer.

* * * * *

UNITED STATES PATENT OFFICE
CERTIFICATE OF CORRECTION

Patent No. 3,817,381     Dated June 18, 1974

Inventor(s) Don E. Heskett and John B. Heskett

It is certified that error appears in the above-identified patent and that said Letters Patent are hereby corrected as shown below:

Column 2, line 29, "cooling" should be --cooking--

Column 5, line 27, "activatd" should be --activated--

Column 5, line 33, "systesm" should be --systems--

Column 8, line 51, "or" should be --of--

Column 9, line 19, "fluid" should be --fluids--

Column 9, line 35, delete "fluid"

Column 10, line 32, "system" should be --systems--

Signed and sealed this 22nd day of October 1974.

(SEAL)
Attest:

McCOY M. GIBSON JR.
Attesting Officer

C. MARSHALL DANN
Commissioner of Patents